US012559296B2

(12) United States Patent
Stange et al.

(10) Patent No.: US 12,559,296 B2
(45) Date of Patent: Feb. 24, 2026

(54) METHOD FOR PACKAGING DENTAL COMPONENTS, IN PARTICULAR ARTIFICIAL TEETH, AND PACKAGING SYSTEM

(71) Applicant: KULZER GMBH, Hanau (DE)

(72) Inventors: Frank-Uwe Stange, Langenargen (DE); Matthias Moeller, Eriskirch (DE); Silke Gall, Alzenau (DE)

(73) Assignee: KULZER GMBH, Hanau (DE)

( * ) Notice: Subject to any disclaimer, the term of this patent is extended or adjusted under 35 U.S.C. 154(b) by 30 days.

(21) Appl. No.: 18/382,171

(22) Filed: Oct. 20, 2023

(65) Prior Publication Data

US 2024/0140677 A1  May 2, 2024

(30) Foreign Application Priority Data

Oct. 27, 2022  (DE) .......................... 102022128535.9

(51) Int. Cl.
| | |
|---|---|
| *B65D 77/20* | (2006.01) |
| *A61C 13/08* | (2006.01) |
| *B65B 5/04* | (2006.01) |
| *B65B 7/00* | (2006.01) |
| *B65B 35/30* | (2006.01) |
| *B65D 65/46* | (2006.01) |
| *B65D 75/36* | (2006.01) |

(52) U.S. Cl.
CPC .............. B65D 77/20 (2013.01); A61C 13/08 (2013.01); B65B 5/04 (2013.01); B65B 7/00 (2013.01);
(Continued)

(58) Field of Classification Search
CPC .... B65D 77/20; B65D 65/466; B65D 75/366; B65D 2575/368; B65B 5/04; B65B 7/00; B65B 35/30; A61C 2202/00
(Continued)

(56) References Cited

U.S. PATENT DOCUMENTS 3,111,760 A * 11/1963 Semmelman .......... A61C 19/10
206/83
5,199,567 A 4/1993 Discko, Jr.
(Continued)

FOREIGN PATENT DOCUMENTS

DE          8217131 U1     10/1982
DE    112007003611 T5      9/2010
(Continued)

OTHER PUBLICATIONS

German Office Action mailed Jun. 20, 2023, issued in corresponding German Patent Application No. 10 2022 128 535.9, Filed on Oct. 27, 2022.
(Continued)

*Primary Examiner* — Jacob K Ackun
(74) *Attorney, Agent, or Firm* — PERRY + CURRIER INC.

(57) ABSTRACT

The invention relates to a method for packaging dental components, comprising the method steps: producing or providing a dental component; arranging the dental component with a support side on a support surface of a three-dimensional carrier element, the dental component projecting beyond the edge of the support surface on at least one side, forming a peripheral area; providing a sheet-like semi-finished plastic product comprising a thermoplastic resin; forming the sheet-like plastic semi-finished product in a thermoforming process for form closure of the dental component in a plastic structure, such that the dental component is positively surrounded by the plastic structure in the peripheral area on the support side of the dental component; and separating the dental component partially surrounded by the plastic structure from the carrier element to obtain a packaging system comprising the dental component packaged in the plastic structure.

9 Claims, 2 Drawing Sheets a)

b)

c)

d)

e)

f)

(52) U.S. Cl.
CPC ............ *B65B 35/30* (2013.01); *B65D 65/466* (2013.01); *B65D 75/366* (2013.01); *A61C 2202/00* (2013.01); *B65D 2575/368* (2013.01)

(58) Field of Classification Search
USPC .................................................. 206/83, 63.5
See application file for complete search history.

(56) References Cited

U.S. PATENT DOCUMENTS 6,082,531 A * 7/2000 Hazenbos ............ A61C 19/008
206/83

2012/0175799 A1 * 7/2012 Karlsson .................. A61C 5/20
264/16
2013/0206626 A1 * 8/2013 Schindel ............ A61F 2/30942
53/425

FOREIGN PATENT DOCUMENTS

| DE | 112007003610 B4 | 5/2014 |
|----|-----------------|--------|
| JP | 2012050478 A | 3/2012 |

OTHER PUBLICATIONS

EPO, Extended European Search Report, Mar. 7, 2024, re European Patent application No. 23205456.9 with English translation.

* cited by examiner a)

b)

c)

d)

e)

f)

METHOD FOR PACKAGING DENTAL COMPONENTS, IN PARTICULAR ARTIFICIAL TEETH, AND PACKAGING SYSTEM

The invention relates to a method for packaging dental components, in particular artificial teeth, and a packaging system that can be manufactured using this method.

The area of dental technology and thus in particular the field of activity of dental technicians is regularly character- ized by the handling of a wide range of dental components, which in many cases are relatively small and mostly require very conscientious handling. Since many of these dental components are also high-quality and precisely manufac- tured products, there is a constant need in the area of technology for high-performance packaging for such dental components, which enables safe storage and transport of the dental components, while at the same time being adapted in terms of handling properties to the specific application requirements of dental technology that arise in practice.

The requirements placed on packaging for dental compo- nents can be easily understood, particularly with the example of artificial teeth. Traditionally, artificial teeth are mostly marketed in units of six or eight artificial teeth on plastic strips, on which the artificial teeth are fixed with wax or other adhesive substances, which can be used, for example, in the form of adhesive tapes. This form of arrangement is intended not only to ensure the correct assembly of the artificial teeth placed on the market together, but at the same time to provide good accessibility to the artificial teeth so that the person skilled in the art can, for example, inspect, remove, test and subsequently fasten them back onto the strip.

Although this traditional form of handling artificial teeth satisfies the needs of the skilled person in terms of easy accessibility to the dental components, it is also regularly perceived as disadvantageous in terms of various aspects, especially when handling the dental components outside the controlled environment of a dental laboratory, for example in the course of storage or shipping of industrially produced dental components by the manufacturer.

Fixation with wax or other adhesive substances always means contamination of the contact surfaces of the artificial teeth and regularly necessitates cleaning of the dental com- ponent before further processing. This represents an addi- tional work step, which reduces the time and cost efficiency of many work processes and makes the automation and digitization of work processes more difficult due to the mostly manual performance.

In addition, very long and/or inadequate storage may result in permanent contamination of the dental components by the adhesive substance, which is also referred to as "melting" of the tooth into the carrier material and which is associated with a risk of undesirable material discoloration of the dental component. In addition, many of the adhesive substances used in practice are subject to an aging process, which can cause a deterioration of the fixation strength, particularly if the dental components are removed and rearranged on the acrylic strip on a regular basis. This aging process and/or the general accumulation of dust and dirt on exposed bonding surfaces can, in the worst case, cause the dental components to fall off the plastic strip, which can, for example, cause part of the dental components to be lost or damaged.

In addition to the disadvantageous effects of the adhesive substances required in conventional packaging systems, in many cases, the packaging systems known from the prior art are also perceived as disadvantageous in that the dental components are usually largely exposed on the plastic strips and are not protected, or only to a limited extent, by the packaging systems against environmental influences and particularly mechanical loads. This increases the risk of damage to the dental components.

Against the background of increasing awareness in the area of technology of the need for sustainable management, many of the packaging systems known from the prior art are also perceived as disadvantageous in that they usually have a relatively high material requirement and often result in mixed waste at the end of their service life, which, for example, comprises residues of the adhesive substance in addition to the plastic from the plastic strip and which, as a result, can only be recycled at a relatively high cost.

The primary object of the present invention was to eliminate or at least mitigate the disadvantages of the prior art described above.

In particular, the object of the present invention was to provide a method for packaging dental components, in particular artificial teeth, and a packaging system based thereon, which enables time- and cost-efficient packaging of dental components that takes into account the specific indus- try requirements for handling dental components.

In this respect, it was an object of the present invention that the packaging system producible by the method to be indicated should enable reliable simultaneous packaging or fixation of several dental components, in particular of arti- ficial teeth assembled for the anterior or posterior region, by means of which safe storage and easy transport are made possible without the risk of losing dental components. It was desirable that the packaging system, which could be pro- duced using the specified method, should also protect the dental components packaged in it as well as possible against environmental influences and mechanical stresses.

It was an important object of the present invention that the dental components packaged in the packaging system to be indicated should be as easily accessible as possible from the outside, wherein it was a requirement that the dental com- ponents should be able to be easily reversibly and non- destructively removed from the packaging system and rein- serted therein. In particular, it was desirable for the person skilled in the art to be able to obtain a visual impression of the color of dental components arranged in the packaging system to be specified that is as authentic as possible.

It was a further object of the present invention that the secure packaging of the dental components in the packaging system to be specified should be ensured even after long periods of storage, ideally even under unfavorable storage conditions.

In addition, it was an object of the present invention that the packaging system to be specified should minimize the risk of contamination or unwanted discoloration of the dental components packaged therein, wherein it should be possible in particular to avoid unwanted contamination with wax or other adhesive substances.

It was a complementary object of the present invention that the method to be indicated for the production of the packaging system should require the lowest possible resources. Furthermore, it was desirable that the packaging system specified should be particularly easy to recycle at the end of its service life, wherein desirably in particular no or at least only small amounts of mixed waste should be generated.

The inventors of the present invention have now found that the above-described objects can be solved if dental components are packaged in a packaging process using thermoforming, as defined in the claims, wherein the dental components are placed on a three-dimensional carrier element in such a way that they protrude beyond the edge thereof on at least one side so that a surrounding region is designed, around which a sheet-like plastic semi-finished product can be formed during the thermoforming process in order to achieve a form closure of the dental component on at least one side of the dental component, so that the dental component, after removal of the carrier element, is packaged in a formed plastic structure from which it can be removed reversibly and non-destructively.

With the method according to the invention, it is possible, for example, to place an assembled set of artificial teeth with the labial/buccal side facing downwards in the support surface, designed as a negative mold, of a three-dimensional carrier element and to comprise the respective upper and lower areas of the teeth, which project beyond the lateral edge of the support surface, with a plastic film in the course of a thermoforming process, which is applied in hot, stretchable form and is joined around the artificial teeth lying on the support surface using vacuum or overpressure, so that the thermoformed plastic film also partially comprises the teeth labially/buccally after cooling, and stabilizes them in the packaging system, so that the artificial teeth together with the solidified plastic structure can be removed from the thermoform and separated from the carrier element.

In a packaging system produced in this manner, the artificial teeth are exposed from the side on which the carrier element was previously arranged and are visible to the person skilled in the art without obstruction. Advantageously, this allows reversible and non-destructive removal of the artificial teeth from the packaging system, wherein only a mostly slight, substantially non-permanent deformation of the plastic structure is required. Since the artificial teeth are kept purely retentive, at least with bilateral labial/buccal surrounds, no contamination or discoloration due to adhesive substances occurs. The retentive fixation of the artificial teeth ensures a secure fixation of the artificial teeth even during long storage times and increased temperatures.

The partial enclosure of the artificial teeth with a plastic structure also shields them from numerous environmental influences, wherein the plastic structure also provides advantageous protection against mechanical stresses in view of the reliable fit of the artificial teeth.

The packaging system produced by the method described is characterized by a relatively low overall material requirement, wherein it is possible in particular to form the packaging system from single-grade plastics and/or to dispense with adhesive substances, as a result of which the production of mixed waste can be avoided and the recyclability of corresponding plastic structures is particularly high.

The above-mentioned objects are thus solved by the subject matter of the invention as defined in the claims. Preferred designs according to the invention are apparent from the dependent claims and the following embodiments.

Such embodiments, which are hereinafter designated as preferred, are combined in particularly preferred embodiments with features of other embodiments designated as preferred. Combinations of two or more of the embodiments referred to below as particularly preferred are thus very particularly preferred. Also preferred are embodiments in which a feature of one embodiment designated as preferred to any extent is combined with one or more other features of other embodiments designated as preferred to any extent. Features of preferred packaging systems result from features of preferred methods.

The invention relates to a method for packaging dental components, comprising the method steps:

a) producing or providing a dental component, b) arranging the dental component with a support side on a support surface of a three-dimensional carrier element, wherein the arrangement is carried out in such a manner that the dental component projects beyond the edge of the support surface on at least one side, forming a peripheral area, c) producing or providing a sheet-like semi-finished plastic product comprising a thermoplastic resin, d) forming of the sheet-like plastic semi-finished product in a thermoforming process for form closure of the dental component in a plastic structure, wherein the forming is carried out in such a manner that the dental component is surrounded in a form closure by the plastic structure in the peripheral area on the support side of the dental component, and e) separating the dental component partially surrounded by the plastic structure from the carrier element to obtain a packaging system, wherein the packaging system comprises the dental component packaged in the plastic structure.

The method according to the invention is used for packaging dental components, wherein a packaging system is produced which comprises the packaged dental component.

For the person skilled in the art, the term "dental component" is clear. In accordance with the person skilled in the art, the term comprises components intended for use in the human mouth, in particular the typical parts of dental prostheses, for example inlays, crowns, bridges, implants or veneers, up to partial or full dentures as well as corresponding artificial teeth. However, the term dental components also comprises sub-elements of these components intended for use in the mouth as well as the initial components used in production, such as milling blocks.

According to the inventors, the method according to the invention is particularly suitable for packaging milling blocks from which more complex dental components can be obtained by means of subtractive manufacturing processes, as well as dental prostheses, artificial teeth and other dental moldings, which can be produced, for example, subtractively from milling blocks or additively by means of 3D printing or similar methods, and which are particularly dental prosthesis components, such as inlays, crowns, bridges, implants or veneers. Thus, a method according to the invention is preferred, wherein the dental component is selected from the group consisting of milling blocks, dental prostheses, artificial teeth and dental moldings, particularly subtractively or additively manufactured dental moldings.

According to the inventors, the method according to the invention unfolds its advantages in particular in the packaging of artificial teeth, the packaging and handling of which is particularly demanding in practice and in which particularly pronounced advantages are shown compared to the solutions known for this purpose from the prior art. For substantially all embodiments, particularly preferred is a method according to the invention, wherein the dental component is selected from the group consisting of artificial teeth.

The method according to the invention is particularly suitable for packaging dental components in an industrial manufacturing context. Accordingly, the method according to the invention is particularly advantageous for packaging industrially produced dental components, in particular dental components produced as part of a large-scale manufacturing process. Accordingly, a method according to the invention is particularly preferred, wherein the dental component is selected from the group consisting of industrially manufactured artificial teeth, wherein the person skilled in the art also speaks of so-called prefabricated artificial teeth in this context.

In its simplest embodiment, the method according to the invention serves to package only one dental component. In accordance with the person skilled in the art, the method according to the invention is performed accordingly for one or more dental components. However, the person skilled in the art understands that particularly efficient process controls can be obtained if the method according to the invention is used to simultaneously package several dental components together in such a way that a packaging system is obtained that comprises a plurality of dental components. The simultaneous packaging of two or more dental components is advantageous, as this enables the packaging of larger quantities of dental components in a time-efficient manner. In addition, this approach regularly results in particularly resource-saving methods. In particular, it is possible to efficiently package two or more dental components, which are intended for the same patient, for example, together in the method according to the invention. This aspect is particularly important in the packaging of artificial teeth. Artificial teeth are in fact to be regularly arranged in an assembly of a plurality of matching artificial teeth, which can be done particularly efficiently with the method according to the invention. Packaging systems that comprise six or eight artificial teeth are particularly relevant in practice, as this corresponds to the usual number of artificial teeth for the anterior and posterior areas, respectively. A method according to the invention is therefore preferred, wherein the method is performed simultaneously for two or more, preferably four or more, particularly preferably six or more, most preferably eight or more, in particular preferably six or eight, dental components, wherein the packaging system comprises two or more, preferably four or more, particularly preferably six or more, most preferably eight or more, in particular preferably six or eight, dental components packaged in the plastic structure.

In the method according to the invention, in method step a) the dental component to be packaged is first manufactured, for example by subtractive production from a milling block or by means of additive production, or provided, for example as part of the assembly of a number of six or eight previously manufactured artificial teeth.

In method step b), the one or the plurality of dental components are placed on the support surface of a three-dimensional carrier element. In the context of the present invention, the side of the dental components that points in the direction of the three-dimensional carrier element is referred to as the support side for the purpose of clear assignment. This support side is partially shielded by the underlying carrier element in the subsequent thermoforming process in such a way that it cannot be completely surrounded by the plastic structure. Accordingly, in the manufactured packaging system, the part of the support side of the dental components, which contacts the support surface of the carrier element after the dental components have been arranged on it, is not surrounded by the plastic structure obtained by thermoforming, but remains exposed. Since, in the case of artificial teeth, it is particularly important for the person skilled in the art to be able to inspect without hindrance the areas of the teeth which will be particularly easily visible from the outside when used in the mouth, the inventors suggest that, in the case of artificial teeth, the support side should be formed by the labial or buccal side of the artificial teeth, so that these are partially exposed in the resulting packaging system. Accordingly, a method according to the invention is preferred, wherein the dental component is an artificial tooth, wherein the support side is the labial/buccal side of the artificial tooth.

The purpose of the three-dimensional carrier element is to ensure that the dental components resting on it, which project beyond the edge of the receiving surface on at least one side, are elevated relative to the surrounding base in such a manner that they can also be comprised with the plastic from below, i.e. from the support side or, in the case of artificial teeth, particularly from the labial or buccal side, during the subsequent thermoforming process. The person skilled in the art understands that in typical thermoforming processes, depending on the semi-finished plastic materials used, it can be difficult to comprise the dental components even from below if too little space is provided between the support side and the surrounding substrate. Accordingly, the inventors suggest that a certain minimum height difference should be set by the structural design of the three-dimensional carrier element and the surrounding base areas. In this respect, a method according to the invention is preferred, wherein the support surface in method step d) is elevated relative to the surrounding substrate, wherein the difference in height is preferably 2 mm or more, particularly preferably 5 mm or more, very particularly preferably 10 mm or more.

It can be seen as an advantage of the method according to the invention that only very few requirements are placed on the specific design of the three-dimensional carrier element, so that it can be designed, for example, from a large number of possible materials, and the choice of material can largely depend on availability.

With regard to the structural design of the three-dimensional carrier element, the inventors consider two embodiments in particular to be advantageous. On the one hand, the three-dimensional carrier element can be designed as a separate carrier block which, for example, can be inserted into the mold of the device used for thermoforming if required when the method according to the invention is to be used. This is particularly advantageous if the existing devices for thermoforming are to be used for other purposes in addition to the method according to the invention, so that advantageous convertibility is achieved by using the separate carrier element. As an alternative to this embodiment, suitable in particular for large-scale and industrial processes, the inventors consider an embodiment in which the three-dimensional carrier element is formed directly by a raised carrier structure in the base surface of the thermoform, so that the corresponding thermoform is specifically designed for performing the method according to the invention and can be obtained in one piece in a particularly robust embodiment. Thus, a method according to the invention is preferred for certain applications, wherein the three-dimensional carrier element is a separate carrier block, preferably made of plastic, metal, zirconium oxide, ceramic or dental plaster. Alternatively, a method according to the invention is preferred, wherein the three-dimensional carrier element is formed by a raised carrier structure of a thermoform.

In order to promote a precise arrangement of the dental components on the carrier element as well as a good fixation of the dental components on the carrier element, in particular also during the forming step, the inventors propose that the support surface can be provided with a macroscopic surface structure that supports the arrangement of the dental components. This is particularly advantageous if the method according to the invention is to be used to package dental components, which are always at least partially identical in construction in numerous successive embodiments, as in the case of the packaging of artificial teeth, for example, where in practice there will usually be an assembly of six or eight artificial teeth, which are always similar at least in terms of their basic shape. Against this background, a method according to the invention is preferred, wherein the support surface comprises a macroscopic surface structure with one or more receptacles for receiving dental components, wherein the number of receptacles preferably corresponds to the number of dental components simultaneously packaged during the method.

According to the inventors, it is conceivable in principle, at least in the simplest embodiment of the method according to the invention, if the dental component(s) in each case protrude beyond the receiving surface with only one end at the sides and are accordingly comprised with plastic at only one location by means of thermoforming. However, depending on the design of the method according to the invention, in particular as a function of the extent of the peripheral area, the inventors estimate that, in many cases, there will be designs of the packaging system in which at least partially adhesive fastening is still necessary for practical suitability. In such embodiments, it may be appropriate to additionally fix the components packaged in the plastic structure, which are positively surrounded by the plastic structure on only one side in the peripheral area on the support side, with wax or another adhesive substance to prevent them from falling out unintentionally. Despite partially adhesive fastening, the method according to the invention, even in this simple embodiment, is nevertheless considered advantageous in that the one-sided enclosure of the dental components in the plastic structure provides a certain degree of protection against environmental influences and mechanical stress and, in addition, the need for adhesive substances can be reduced compared to the solutions known from the prior art.

However, in view of the object of making the use of adhesive substances as unnecessary as possible, the inventors consider it preferable for substantially all embodiments if at least a bilateral enclosure of the dental components with the plastic structure is achieved, so that exclusively retentive fixation is possible. This can be achieved if the dental components protrude beyond the support surface on two sides and two peripheral areas are designed accordingly, which can be comprised by the plastic material during thermoforming, so that the dental components in the peripheral areas are surrounded by the plastic structure on all sides with a form closure after removal of the three-dimensional carrier element on opposite sides, for example at the top and bottom. Accordingly, a method according to the invention is particularly preferred, wherein the arrangement is carried out in such a manner that the dental component projects beyond the edge of the support surface, forming a first peripheral area on a first side and forming a second peripheral area on a second side, preferably on two opposite sides. In this case, forming takes place in such a manner that the dental components are positively surrounded by the plastic structure in the first peripheral area and in the second peripheral area on the support side of the dental components.

In method step c), the material is now provided that is to be placed around the dental components in the subsequent thermoforming step. The advantage of the method according to the invention is that it is very flexible with regard to the materials that can be used, so that in principle all sheet-like semi-finished plastics known from the prior art as semi-finished plastics for thermoforming processes can be used. In accordance with the person skilled in the art, sheet-like plastic semi-finished products are plastic films or plastic sheets, wherein the transition between films and sheets is ultimately blurred. With a view to making the method according to the invention as resource-saving as possible, the inventors suggest that the average thickness of the sheet-like plastic semi-finished products should not be selected too high in order to minimize the material requirement and also to be able to keep the temperatures required for thermoforming as low as possible. Accordingly, the inventors regard as preferred such sheet-like semi-finished plastic products that can be described as a film. Consequently, a method according to the invention is preferred, wherein the sheet-like plastic semi-finished product is a plastic film.

In an advantageous embodiment, the inventors suggest in this respect that colored or printed semi-finished plastic products can also be used to obtain visually particularly attractive packaging systems and/or to implement the necessary markings. Accordingly, a method according to the invention is preferred, wherein the sheet-like semi-finished plastic product is a dyed and/or printed semi-finished plastic product, particularly preferably a printed semi-finished plastic product.

As explained above, the method according to the invention can be carried out in an advantageous manner with typical sheet-like plastic semi-finished products known to the person skilled in the art as starting materials for thermoforming processes. Even if it is conceivable in principle that other constituents, such as fillers, are added to the corresponding semi-finished plastic products, in practice the corresponding sheet-like semi-finished plastic products usually consist largely or almost entirely of thermoplastic resin, which is also appropriate for the method according to the invention. Accordingly, a method according to the invention is preferred, wherein the sheet-like plastic semi-finished product consists of 90% or more, preferably 95% or more, particularly preferably 98% or more, most preferably substantially completely, of the thermoplastic resin, based on the mass of the plastic semi-finished product. Exemplary is a method according to the invention, wherein the thermoplastic resin is selected from the group consisting of polyvinyl chloride, polystyrene, polyesters, polyolefins, acrylonitrile-butadiene-styrene copolymers and mixtures of these plastics, preferably selected from the group consisting of polyvinyl chloride, polystyrene, polyethylene terephthalate, polypropylene, butadiene-styrene copolymers and mixtures of these plastics.

In the course of developing the method according to the invention, the inventors recognized that particularly sustainable packaging systems can advantageously be obtained if biobased or biodegradable thermoplastics resins are used as the thermoplastic resin, wherein particularly those thermoplastic resins are preferred which are both biobased and biodegradable. Corresponding materials are known to the person skilled in the art and are commercially available as biobased thermoplastic resins or biodegradable thermoplastic resins. Accordingly, a method according to the invention is preferred, wherein the thermoplastic resin is selected from the group consisting of bio-based thermoplastic resins and biodegradable thermoplastic resins, preferably selected from the group consisting of bio-based polyethylene terephthalate, polyethylene furanoate, polylactic acid, polybutylene succinate and mixtures of these plastics.

In method step d) of the method according to the invention, the sheet-like semi-finished plastic product is formed in a thermoforming process to comprise the dental components arranged on the three-dimensional carrier element in a form closure. In the context of the present invention, the term "form closure" is to be understood in this context in accordance with the person skilled in the art as "at least partially form closure". In any case, a design in the sense of "substantially form closure" is preferred, and very particularly preferred in the sense of "substantially complete form closure". The person skilled in the art understands that in practice the method according to the invention will regularly result in a substantially complete form closure on the side of the dental components facing away from the support side and in the peripheral areas, but that small deviations from a perfect form closure caused by production and/or deviations from a perfect form closure deliberately produced by additional measures may occur.

The basic concept of thermoforming processes is well-known to the person skilled in the art based on his general expertise, and suitable devices for performing the thermoforming process are commercially available from various suppliers. The concept of thermoforming, which is sometimes also referred to by the person skilled in the art as thermoforming or deep drawing due to its superficial similarity to the corresponding metal processing method, is based on the fact that the sheet-like semi-finished plastic product used is made moldable by increasing the temperature and is applied to the dental component, wherein overpressing and/or underpressing is usually used to obtain the most form-locking enclosure possible. In accordance with the person skilled in the art, a negative pressure is regularly generated on the side of the sheet-like plastic semi-finished product on which the object to be encompassed is comprised, which is optionally combined with an applied positive pressure on the other side of the sheet-like plastic semi-finished product so that the moldable plastic mass adapts as closely as possible to the underlying structure. It can be seen as an advantage of the method according to the invention that it can be performed with typical thermoforming processes and commercially available thermoforming devices. Correspondingly, a method according to the invention is also relevant for substantially all embodiments, wherein method step d) is performed using a thermoforming device, and/or wherein the carrier element with the dental component arranged on the support surface is comprised in a thermoform in method step d) or wherein the carrier element is formed by a raised carrier structure of a thermoform in method step d), wherein the thermoform preferably comprises one or more fluid outlets, wherein the one or more fluid outlets are particularly preferably connected to a pump arrangement in a fluid line manner. A method according to the invention is preferred, wherein the forming is promoted or effected by a negative pressure prevailing on one side of the sheet-like plastic semi-finished product and/or an overpressure prevailing on one side of the sheet-like plastic semi-finished product, preferably by a negative pressure prevailing on one side of the sheet-like plastic semi-finished product and an overpressure prevailing on the other side of the sheet-like plastic semi-finished product.

In practical implementation, the optimum temperature for the thermoforming process will regularly depend on the type of thermoplastic resin as well as the selected thickness of the sheet-like plastic semi-finished product. In this respect, however, the inventors have succeeded in identifying optimized temperature ranges with which packaging systems with particularly advantageous handling properties can be obtained in the method according to the invention when using conventional thicknesses of sheet-like plastic semi-finished products, particularly in the region of 0.4 to 1.2 mm, preferably in the region of 0.5 to 0.8 mm, and for the thermoplastic resins normally used, particularly for polyester, preferably for copolyester. In fact, a method according to the invention is preferred, wherein the sheet-like semi-finished plastic product has a temperature in the region of 100 to 200° C. during forming, preferably in the region of 140 to 200° C., particularly preferably in the region of 160 to 200° C.

In method step e), the plastic structure with the dental component packaged therein is separated from the carrier element, which can subsequently be used again as a carrier element in the method according to the invention, for example. Since a part of the surface of the support side of the dental components was covered by the three-dimensional carrier element during thermoforming and accordingly could not be comprised in method step d), this part of the packaged dental components is exposed in the packaging system after removal of the carrier element. The inventors consider it advantageous if the carrier element is firmly connected to the thermoform used in such a manner that separation can be achieved by removing the thermoformed plastic structure together with the dental components from the thermoform. Accordingly, a method according to the invention is preferred, wherein the separation in method step e) is performed by releasing the plastic structure from a thermoform.

Depending on the design of the thermoform, the plastic structure obtained can subsequently be cut to size in order to reduce the space required and/or to adapt the contour, which in particular improves manageability during storage and transport and minimizes the space required. Preferred for this purpose is a method according to the invention, additionally comprising the method step:

(f) separating a partial area of the packaging system, wherein the partial area comprises the dental component packaged in a portion of the plastic structure, wherein the separation is preferably performed by a separation process, preferably by cutting or punching.

According to the inventors, a further advantage is that markings, such as trademarks or instructions for use, can be applied particularly easily to the plastic structure obtained. Preferred for this purpose is a method according to the invention, additionally comprising the method step:

(g) applying a marking to the packaging system, particularly the plastic structure, or to a partial area of the packaging system, wherein the application of the marking is preferably performed by a method selected from the group consisting of laser engraving methods and printing methods, particularly preferably selected from the group consisting of laser engraving methods and 3D printing methods.

In addition or as an alternative to the marking described above, a label can be applied to the back of the packaging systems, which can contain, for example, additional information about the packaged dental components, but which can also act as a contrast surface against the background of which the dental components can be evaluated particularly well in terms of their optical properties, which is considered advantageous particularly in the packaging of artificial teeth. Accordingly, a method according to the invention is preferred, additionally comprising the method step:

h) applying a label, particularly made of paper or cardboard, to the side of the packaging system formed entirely by the plastic structure.

The person skilled in the art understands that the invention also relates to a corresponding packaging system that can be obtained via the method according to the invention. The invention thus also relates to a packaging system, preferably produced or producible using the method according to the invention for packaging dental components, comprising:

i) a plastic structure having at least one receiving recess, and ii) at least one dental component, wherein the dental component is arranged with a form closure in the receiving recess with an insertion side, wherein the dental component arranged in the receiving recess is covered with a form closure by the plastic structure in at least one peripheral area on a presentation side opposite the insertion side, wherein the packaging system is configured to allow the dental component to be reversibly and non-destructively removed from the receiving cavity and reinserted into the receiving cavity using an at least partially reversible deformation of the plastic structure.

The packaging system according to the invention comprises a plastic structure with at least one receiving recess, which—as disclosed above—can be obtained by forming a sheet-like plastic semi-finished product around a dental component arranged on a three-dimensional carrier element. In addition, the packaging system according to the invention comprises the dental component packaged in the plastic structure, which is positively arranged in the receiving recess immediately after the method and is also covered on the surface by the plastic structure on at least one side in the peripheral area. The side of the dental component that is fully covered by the plastic structure in this state is referred to as the insertion side. The opposite side is only partially covered by the plastic structure wherein the dental component is exposed at the location that was covered by the three-dimensional carrier element during thermoforming. With this in mind, the side of the dental component facing in this direction is also referred to as the presentation side, wherein the person skilled in the art understands that the presentation side of the dental component in the packaging system according to the invention corresponds to the support side of the dental component in the method according to the invention.

By this embodiment, the packaging system according to the invention is configured so that the dental components packaged therein can be reversibly and non-destructively removed from the receiving cavity and subsequently reinserted into the receiving cavity, thereby fixing them back into the plastic structure. The packaging system according to the invention is configured to remove or insert the dental components in such a way that the plastic structure is at least partially reversibly deformed. The necessity of such a deformation during removal or insertion of the dental component results from the form closure of the presentation side by the plastic structure in the peripheral areas.

The specific design of the plastic structure, as obtained by the thermoforming process, and the use of a thermoplastic resin to form the plastic structure mean that this deformation of the plastic structure is also at least partially reversible. The person skilled in the art understands that the deformation is preferably predominantly, particularly preferably substantially completely, reversible, so that the plastic structure imprinted by thermoforming remains substantially unchanged even after repeated removal of the dental components.

However, the person skilled in the art understands in this respect that mechanical deformation of a thin thermoplastic resin can always be connected in practice with at least small irreversible portions of the deformation, at least at the molecular level, wherein these are unlikely to be noticeable in practice according to the inventors. The at least partially reversible deformation is brought about in particular by the structural design of the plastic structure, which is produced from a comparatively thin sheet-like semi-finished plastic product, and optionally by the use of thermoplastic elastomers as the thermoplastic resin.

The dental components can be removed from the packaging systems according to the invention, for example, manually or using a removal tool, for example tweezers, wherein it is particularly possible that the plastic structure is deformed manually and/or the dental component is levered out of the receiving recesses using a tool.

Preferred packaging systems according to the invention are produced by preferred methods according to the invention.

Accordingly, a packaging system according to the invention is preferred, wherein the packaging system comprises two or more, preferably four or more, particularly preferably six or more, most preferably eight or more, in particular preferably six to eight, dental components, and wherein the plastic structure comprises two or more, preferably four or more, particularly preferably six or more, most preferably eight or more, in particular preferably six to eight, receiving recesses, wherein the packaging system preferably comprises one receiving recess for each dental component.

Additionally or alternatively, a packaging system according to the invention is also preferred, wherein the dental component is selected from the group consisting of milling blocks, dental prostheses and artificial teeth, preferably selected from the group consisting of artificial teeth.

Additionally or alternatively, a packaging system according to the invention is also preferred, wherein the dental component is an artificial tooth, wherein the presentation side is the labial/buccal side of the artificial tooth.

Additionally or alternatively, a packaging system according to the invention is also preferred, wherein the dental component arranged in the receiving recess is covered by the plastic structure at least in a first peripheral area and a second peripheral area on a presentation side opposite the insertion side.

Additionally or alternatively, a packaging system according to the invention is also preferred, wherein the plastic structure consists of 90% or more, preferably 95% or more, particularly preferably 98% or more, most preferably substantially completely, of the thermoplastic resin, based on the mass of the plastic structure.

Additionally or alternatively, a packaging system according to the invention is also preferred, wherein the packaging system comprises a marking, preferably a printing or engraving, and/or a label applied to the side completely formed by the plastic structure.

Additionally or alternatively, a packaging system according to the invention is also preferred, wherein the packaging system does not comprise any means for the material-locking connection of the dental component to the plastic structure, in particular no adhesive masses or waxes.

In light of the foregoing, a particularly preferred method according to the invention is disclosed below, which in the eyes of the inventors is also particularly advantageous in combination with further preferred features. Particularly preferred is a method according to the invention, comprising the method steps:

aa) producing or providing six or more artificial teeth, preferably six or eight artificial teeth, bb) arranging the artificial teeth with a support surface on a support surface of a three-dimensional carrier element, wherein the support surface is preferably the labial/buccal side of the artificial teeth, wherein the arrangement is carried out in such a way that the artificial teeth project beyond the edge of the support surface, forming a first peripheral area on a first side and a second peripheral area on a second side, cc) producing or providing a sheet-like semi-finished plastic product comprising a thermoplastic resin, dd) forming the sheet-like plastic semi-finished product in a thermoforming process for form closure of the artificial teeth in a plastic structure, wherein the forming is carried out in such a way that the artificial teeth are positively surrounded by the plastic structure in the first peripheral area and in the second peripheral area on the support side of the artificial teeth, and ee) separating the artificial teeth surrounded in sections by the plastic structure from the carrier element to obtain a packaging system, wherein the packaging system comprises six or more, very preferably eight or more artificial teeth packaged in the plastic structure.

In the following, preferred embodiments of the invention are explained and described in more detail with reference to the accompanying figures. in which:

FIG. 1 shows a highly simplified schematic diagram of the method for packaging dental components 10 according to the invention.

Figure 1:
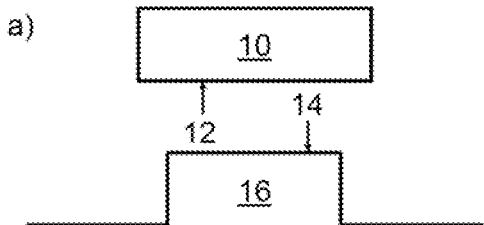
FIG. 1 shows a schematic diagram of the method steps of the method according to the invention in a preferred embodiment.
Figure 1:
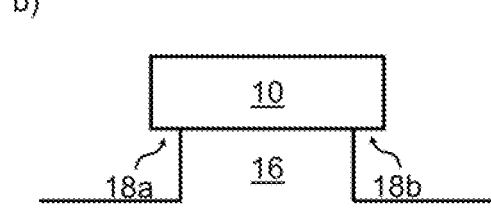
Figure 1:
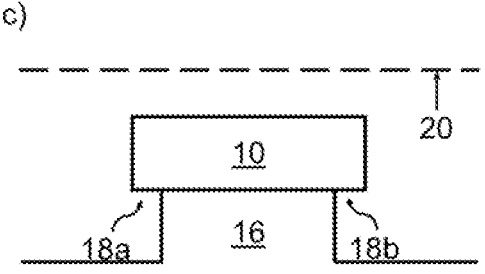
Figure 1:
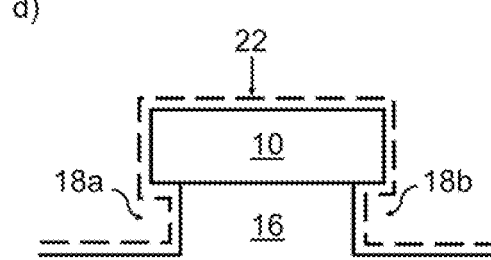
Figure 1:
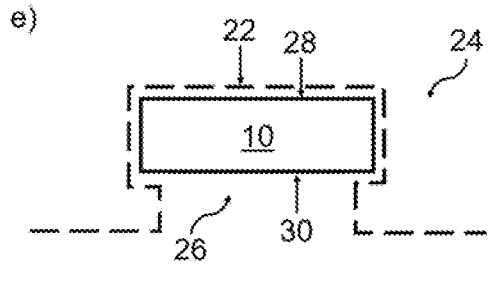
Figure 1:
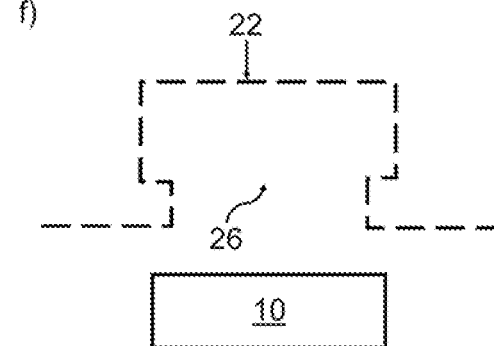

FIG. 1a) shows how a dental component 10 abstracted as a box is arranged with the support side 12 on the support surface 14 of a three-dimensional carrier element 16, which rises above the surrounding base surface. The resulting arrangement is shown in FIG. 1b), wherein the peripheral areas 18a, 18b are indicated, which result from the fact that the dental component 10 projects beyond the edge of the support surface 14 on two sides. FIG. 1c) now shows how a sheet-like plastic semi-finished product 20 is provided, whereas FIG. 1d) shows the state that results after forming this sheet-like plastic semi-finished product 20. In FIG. 1d) it can be clearly seen how the previously sheet-like semi-finished plastic material 20 now fits as a plastic structure 22 with substantially complete form closure around the dental component 10 and around the side surfaces of the three-dimensional carrier element 16.

After solidification of the plastic structure 22 thus formed by means of thermoforming, the resulting packaging system 24 can be obtained by lifting the plastic structure 22 together with the dental component 10 embedded therein from the carrier element 16. In FIG. 1e), the partially exposed presentation side 30 and the opposite insertion side 28, with which the dental component 10 rests in the process-produced receiving recess 26, are indicated. FIG. 1f) schematically visualizes the removal of the dental component 10 from the receiving recess 26 created in the plastic structure 22, wherein it is evident from the schematic diagram that the deformation of the plastic structure 22 necessary for the removal has been substantially completely reversible, so that the dental component 10 has been reversibly and non-destructively removed from the receiving recess 26 and can be reinserted into the receiving recess 26 if required.

FIGS. 2 to 5 visualize the performance of the method according to the invention in a particularly preferred embodiment by means of a practical example, wherein the figures represent abstracted graphic representations of real photographs taken during the inventors' experiments.

Figure 2:
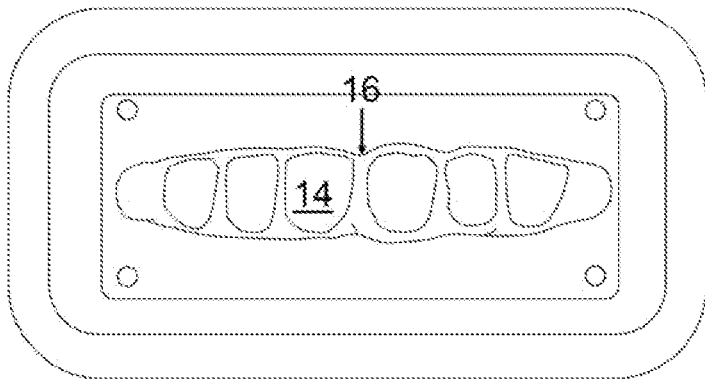
FIG. 2 shows a schematic diagram of a three-dimensional carrier element arranged in a thermoform.

FIG. 2 schematically visualizes the view into the thermoform of a thermoforming device, the base surface of which is surrounded by a side wall with a circumferential edge and comprises four openings for applying a vacuum, wherein a three-dimensional carrier element 16 is arranged centrally on the base surface, which is designed as a separate carrier element 16 and is made of plastic. In the example shown, the carrier element 16 comprises six receptacles on the receptacle surface 14 for receiving a total of six artificial teeth, which in the example shown are anterior teeth that have been specifically assembled as a set for later use and are to be packaged together.

Figure 3:
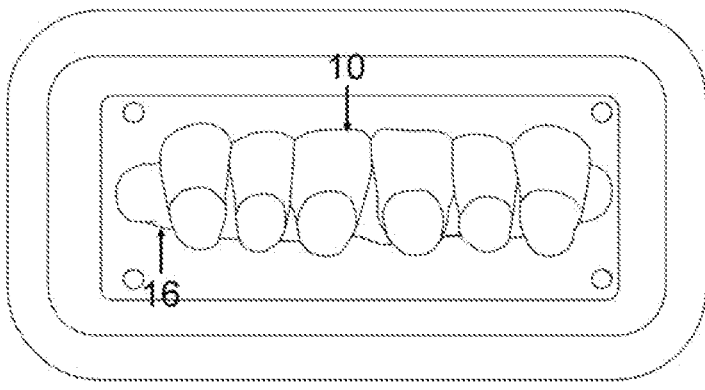
FIG. 3 shows the arrangement of FIG. 2 with dental components arranged thereon.

Based on this, FIG. 3 shows how a total of six artificial anterior teeth are arranged as dental components 10 with the labial side facing downward on the support surface 14 of the carrier element 16. The artificial teeth project beyond the edge of the support surface 14 on two opposite sides, i.e. at the top and bottom, wherein the dental components 10 arranged in this way have a distance of approximately 5 millimeters in each of the designed peripheral areas 18a, 18b from the surrounding base of the thermoform.

The arrangement shown in FIG. 3 was subsequently encased in a plastic structure 22 using a thermoforming process. In the example shown, a plastic film with an average thickness of approximately 0.6 mm was used, which consisted substantially entirely of a copolyester (CAS: 261716-943). The thermoforming is carried out at a temperature in the area of 160 to 200° C., whereby it was possible to obtain a packaging system 24 that has particularly good handling properties and in particular especially good removability of the dental components 10.

Figure 4:
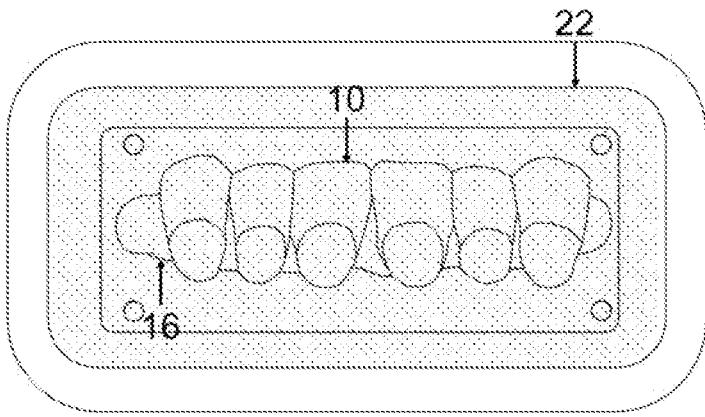
FIG. 4 shows the arrangement of FIG. 3, which has been covered with a plastic structure by means of thermoforming.

The arrangement obtained by thermoforming is shown in FIG. 4, wherein the hatching indicates that the corresponding areas are now coated with a plastic layer of the plastic structure 22 compared to the representation of FIG. 3.

Figure 5:
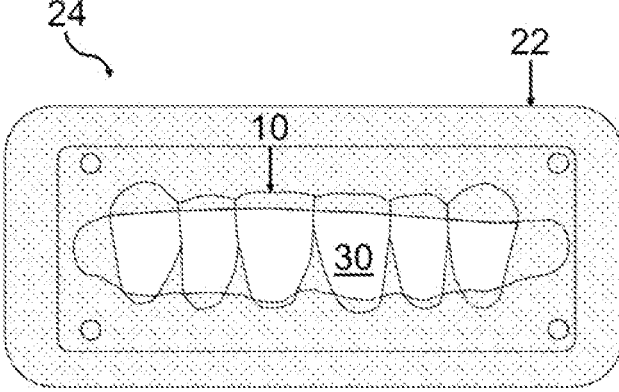
FIG. 5 shows a schematic diagram of a packaging system according to the invention, which was obtained starting from the arrangement of FIG. 4.

Finally, FIG. 5 shows the packaging system 24 according to the invention, which can be obtained starting from the arrangement of FIG. 4 when the plastic structure 22 is lifted out of the thermoforming mold so that the carrier element remains in the thermoforming mold. The view of FIG. 5 is directed to the presentation side of the artificial teeth, i.e. the side of the artificial teeth that is exposed, i.e. the labial side in the example shown. Accordingly, the packaging system 24 in FIG. 5 according to the invention comprises six receiving recesses 26 in the plastic structure 22 and, as dental components 10, six corresponding artificial anterior teeth, which are each arranged with their insertion side 28 in a form-locking manner in the receiving recess 26 and are thereby substantially completely covered by the plastic structure 22 at the top and bottom in a peripheral area 18a, 18b also on the presentation side 30 opposite the insertion side 28, so that they are fixed by the plastic structure 22. The artificial teeth can be reversibly and non-destructively removed from the respective receiving recesses 26 in the resulting packaging system 24 according to the invention, and reinserted into the receiving recesses 26 as needed, wherein there is substantially complete reversible deformation of the plastic structure 22.

LIST OF REFERENCE SYMBOLS

10 dental component
12 support side
14 support surface
16 three-dimensional carrier element
18a-b peripheral area
20 sheet-like plastic semi-finished product
22 plastic structure
24 packaging system
26 receiving recess
28 insertion side
30 presentation side

The invention claimed is:

1. A method for packaging dental components, comprising the method steps:

a) producing or providing a dental component, b) arranging the dental component with a support side on a support surface of a three-dimensional carrier element, wherein the arrangement is carried out in such a manner that the dental component projects beyond the edge of the support surface on at least one side, forming a peripheral area, c) producing or providing a sheet-like plastic semi-finished product comprising a thermoplastic resin, d) forming the sheet-like plastic semi-finished product in a thermoforming process for form closure of the dental component in a plastic structure, wherein the forming is carried out in such a manner that the dental component is surrounded in a form closure by the plastic structure in the peripheral area on the support side of the dental component, and e) separating the dental component partially surrounded by the plastic structure from the carrier element to obtain a packaging system, wherein the packaging system comprises the dental component packaged in the plastic structure.

2. The method according to claim 1, wherein the dental component is selected from the group consisting of milling blocks, dental prostheses, artificial teeth, and dental moldings.

3. The method according to claim 2, wherein the dental component is an artificial tooth, wherein the support side is the labial/buccal side of the artificial tooth.

4. The method according to claim 1, wherein the method is performed simultaneously for two or more dental components, wherein the packaging system comprises two or more packaged dental components.

5. The method according to claim 1, wherein the arrangement is such that the dental component protrudes beyond the edge of the support surface forming a first peripheral area on a first side and forming a second peripheral area on a second side.

6. The method according to claim 1, wherein the thermoplastic resin is selected from the group consisting of biobased thermoplastics resins and biodegradable thermoplastics resins.

7. The method according to claim 1, wherein the sheet-like plastic semi-finished product has a temperature in the region of 100 to 200° C. during forming.

8. The method according to claim 1, further comprising the method step:

f) separating a partial area of the packaging system, wherein the partial area comprises the dental component packaged in a portion of the plastic structure.

9. The method according to claim 1, further comprising the method step:

g) applying a marking to the packaging system or to a partial area of the packaging system.

* * * * *